United States Patent [19]

Baumert et al.

[11] Patent Number: 4,842,321
[45] Date of Patent: Jun. 27, 1989

[54] PANEL HAVING A BENDING REGION, PARTICULARLY FOR VEHICLES

[75] Inventor: Heinz Baumert, Sindelfingen; Nikolaus S. Maass, Boblingen, both of Fed. Rep. of Germany

[73] Assignee: Daimler-Benz Aktiengesellschaft, Stuttgart, Fed. Rep. of Germany

[21] Appl. No.: 133,649

[22] Filed: Dec. 16, 1987

[30] Foreign Application Priority Data

Dec. 16, 1986 [DE] Fed. Rep. of Germany ....... 3642876

[51] Int. Cl.$^4$ ............................................... B60J 3/02
[52] U.S. Cl. .............................. 296/97.1; 296/180.2; 160/370.2; 160/229.1; 16/321
[58] Field of Search .............. 296/97 H, 97 R, 97 K, 296/100; 160/DIG. 3, 229.1, 235; 16/225, 319, 321; 403/93, 97, 84

[56] References Cited

U.S. PATENT DOCUMENTS

| | | | |
|---|---|---|---|
| 2,388,297 | 11/1945 | Slaughter | 160/229.1 X |
| 3,092,870 | 6/1963 | Baer | 160/229.1 X |
| 3,102,609 | 9/1963 | Gerard | 403/93 X |
| 3,233,277 | 2/1966 | Hirashiki | 160/229.1 X |
| 3,244,447 | 4/1966 | Whitaker | 296/97 R |
| 3,610,680 | 10/1971 | Brady | 16/225 X |
| 3,981,470 | 9/1976 | Rutili et al. | 16/225 X |
| 4,210,361 | 7/1980 | Marvin et al. | 296/100 X |
| 4,279,064 | 7/1981 | Simme | 296/100 X |
| 4,438,605 | 3/1984 | DeLucia | 160/235 X |
| 4,570,990 | 2/1986 | Flowerday | 296/97 H |
| 4,606,572 | 8/1986 | Maguire | 296/95 C X |
| 4,620,813 | 11/1986 | Lacher | 403/93 |
| 4,647,102 | 3/1987 | Ebrahimzadeh | 296/97 R X |
| 4,747,441 | 5/1988 | Apolzer et al. | 296/100 X |

Primary Examiner—Robert R. Song
Assistant Examiner—Andrew C. Pike
Attorney, Agent, or Firm—Barnes & Thornburg

[57] ABSTRACT

The invention relates to a laminar masking device, particularly for use in/on vehicles, comprising a plurality of surface sections mutually flexible with common bending axes, which are transferable alternately into two required bending positions and are retained therein. In order that the masking device may be particularly well adapted in the structural context to existing space conditions, it is flexible only at an obtuse angle at each bending axis located between two adjacent surface sections. A plurality of mutually aligned surface sections of the masking device are constructed as narrow connecting strips, and all the surface sections of the masking device are retained in the required mutual bending position by self-locking at the bending axes.

26 Claims, 3 Drawing Sheets

PANEL HAVING A BENDING REGION, PARTICULARLY FOR VEHICLES

BACKGROUND AND SUMMARY OF THE INVENTION

The invention relates to a laminar masking device particularly for use with vehicles, such as sun visors or the like.

A masking device of this general type is already known in the form of a sun visor, for example, from German Utility Model (DE-GM) 71 20 369. It comprises three parts of equal width, which are mutually articulately connected, and which are foldable on each other in order to occupy a rest position. In this case the parts have to be pivoted mutually through 180°. In spite of a prescribed positive folding sequence of the parts, the manipulation of the sun visor is relatively complicated. Furthermore, a stack height which corresponds approximately to three times the thickness of the sun visor is obtained in the rest position of the sun visor. An installation space admitting of such a stack height is usually not structurally available in all vehicle body designs.

The problem of the stack height is eliminated in the case of one-part sun visors, such as are known from German Patent (DE-PS) No. 33 38 774, for example. The operation of such sun visors is also problem-free, because they are articulated only at one edge side.

On the other hand, a one-part sun visor which is foldable up towards the vehicle roof in a customary manner requires a pivoting clearance corresponding to it full width extension.

In motor vehicles with a flat inclination of the windscreen, however, the heads of the front occupants are already in the proximal region of the front windscreen frame profile, so that the required clearance for the functionally necessary pivoting operation of the sun visor is not immediately present. This fact necessarily leads again to a multi-part sun visor, that is to say reducible in width.

The problem explained does not only affect sun visors in motor cars, but also, in similar form, other masking devices which are customary in vehicle construction. The following are given as examples of such masking devices:

- masking means for assembly apertures, vehicle body cavities, or the like which have to be kept accessible;
- cover-like masking means of storages and door pockets;
- roller-blind-like sight screen devices of load surfaces;
- dividing gap covering means between two mutually adjustable components, such as between seat back rests and seat cushions of vehicle seats or the like; and
- cover-like cladding covering means for mechanisms arranged sunk in the vehicle body, such as belt height adjusting means or the like.

It is therefore an underlying object of the invention to develop further a laminar masking device, particularly for vehicles, of the type in question, so that it is well adaptable in the structural context to existing space conditions, that a change of the bending positions is possible with reduced folding extension, and that the manipulation of the masking means is particularly simple.

This object is achieved according to preferred embodiments of the invention by providing that the masking device, with the addition of a corresponding number of mutually aligned connecting strips pivotally connected about common bending axes, may also be used for acute overall bending angles. Independently of overall bending angles of the masking device, an arcuately curved bending region made of connecting strips is obtained for its construction.

Advantageously, in especially preferred embodiments of the invention the bending axes are each constructed self-locking between the prescribed bending positions over their total bending angle, so that the masking device is also fixed in each intermediate position.

The required self-locking forces may be dimensioned appropriately according to the purpose of use, whilst differences may also arise from the arrangement of the masking device, because the arrangement is conceivable both with a horizontal and with a vertical orientation of the bending axe according to various contemplated embodiments of the invention. For a simple operation the masking device is bent manually in the bending region, whilst the self-locking of the bending axes has to be overcome.

The laminar masking device need also not remain restricted to the vehicle installations hitherto mentioned, because "external applications" on the vehicles are also conceivable according to other contemplated embodiments of the invention.

In the case of a corresponding large-format configuration, the masking device could also serve as a lateral door or lateral flap of sales vehicles according to certain contemplated embodiments. Beyond the flap function such masking device could be hinged laterally and upwards as a protection against sun or rain for customers standing at the sales vehicle.

Versatile purposes of use are also conceivable in other fields of daily life - beyond the application of the masking device on vehicles - here, the principle according to the invention would give the masking device advantages over known solutions. As an example, only a use as an adjustable wall or the like flexibly adaptable to the space conditions, will be mentioned.

An especially preferred embodiment of the masking device is as a sun visor which is explained more fully below with reference to an exemplary embodiment as representative of other contemplated masking devices constructed according to the principle of the invention.

Other objects, advantages and novel features of the present invention will become apparent from the following detailed description of the invention when considered in conjunction with the accompanying drawings.

DETAILED DESCRIPTION OF THE DRAWINGS

Figure 1:
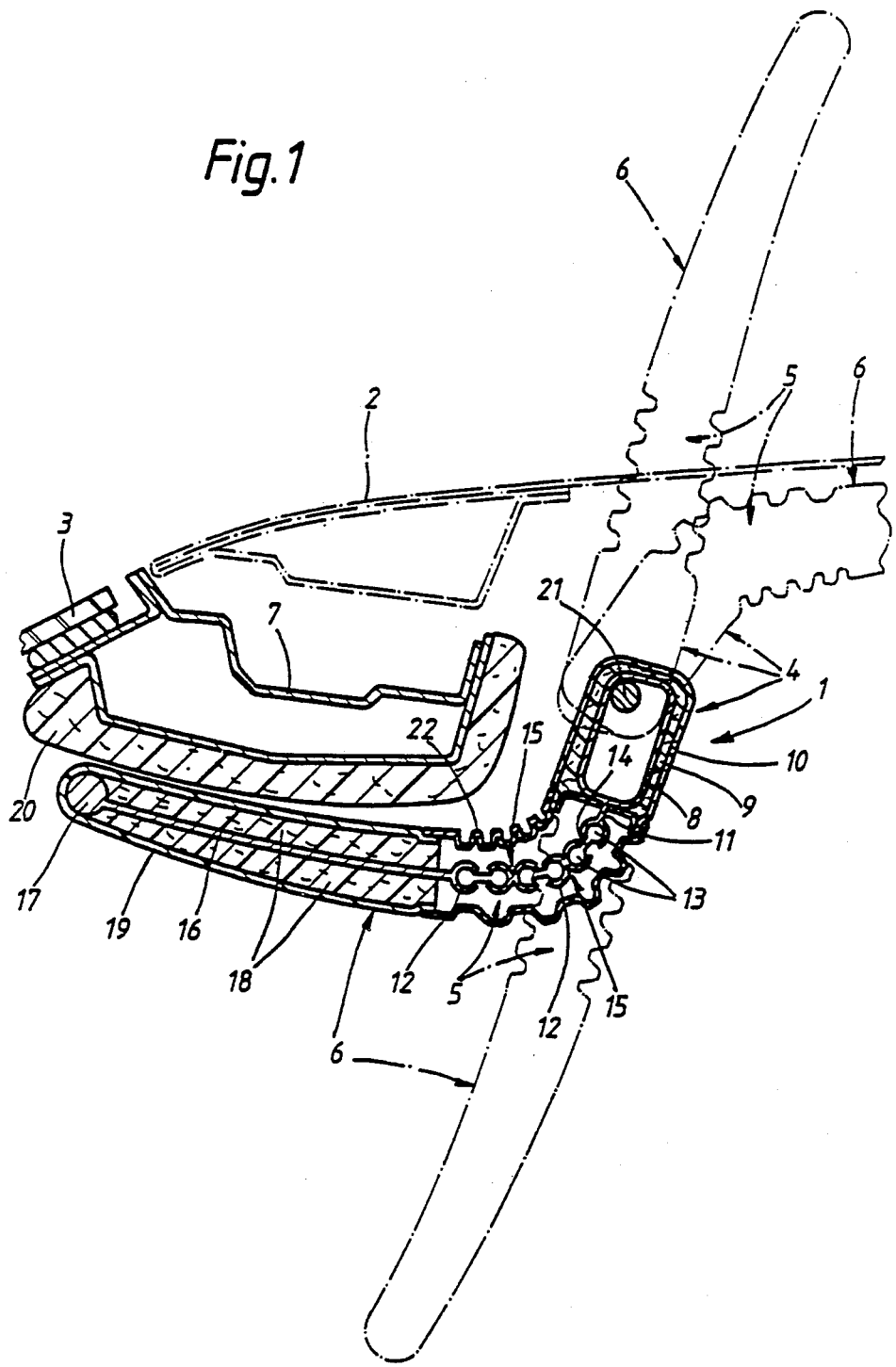
FIG. 1 is a schematic partial sectional view through a sun visor arrangement constructed according to a preferred embodiment of the invention.

FIG. 1 illustrates a sun visor in its installation position arranged in the interior of a motor car in the transition region between an associated roof 2 and a windscreen 3. The sun visor 1 is transferable alternately from an extended anti-glare position in front of the windscreen 3, which is indicated by dash-lines, into a rest position angled through approximately 90°.

The sun visor 1 comprises as principal parts a base section 4, a bending region 5 and a terminal section 6. The illustrated cross-section of the principal parts 4, 5 and 6 is approximately constant along the total length of the sun visor 1, so that a general view is unnecessary. The base section 4 exhibits a somewhat rectangular cross-section and is arranged behind a top frame profile 7 of the windscreen frame, whilst it is oriented approximately parallel to the opposite external contour of the frame profile 7. Here, the width of the base section 4 is dimensioned so that it corresponds substantially to the height of the frame profile 7.

An impact element 8, which is formed by a rectangular hollow element made of plastically deformable sheet metal, is integrated as a supporting structure in the base section 4. The impact element 8 extends virtually over the total width of the base section 4 and is cushioned on its top narrow side and both wide sides with a layer of resilient hard foam 9, such as polyurethane or the like, which is in turn coated with a plastic foil 10. A narrow connecting rail 11, which is connected rigidly to the impact element 8 and projects out of the latter at its bottom narrow side centrally and approximately at right angles to the connecting surface, already belongs to the bending region 5 and likewise consists of sheet metal.

The connecting rail 11 merges into a tubular element 12 which consists of resilient metal. The external diameter of the tubular element 12 is dimensioned definitely smaller than the inside depth of the impact element 8. The tubular element 12 is slitted throughout on its circumferential surface opposite the connecting rail 11 and is opened resiliently. It embraces positively on its full length a corresponding hinge bolt 13, which is thus maintained rotatably in the inside cross-section of the tubular element 12. A narrow connecting web 14, which is shaped on the hinge bolt 13, penetrates the spread inside cross-section of the tubular element 12. The thickness of the connecting web 14 is thus coordinated with the inside spread width of the tubular element 12 so that the rotation of the hinge bolt 13 in the tubular element 12 is limited to an acute angle of rotation. Consequently, only an obtuse-angled deviation of the connecting web plane from the connecting rail plane is possible. The width of the connecting web 14 corresponds approximately to the width of the connecting rail 11, but may be varied for adaptation depending upon the bending arc required.

A second hinge bolt 13, preferably of the same bolt diameter as the first, is likewise shaped on the narrow side of the connecting web opposite the first hinge bolt 13, so that an integral component of circular dumb-bell-shaped cross-section is obtained. The second hinge bolt 13 is in turn embraced by a resilient tubular element 12, which forms one half of a connecting strip 14. The width of the connecting web 14 must therefore be chosen greater than twice the wall thickness of the tubular element 12, so that the connecting web 14 may be used as a stop to limit the angle of rotation of both the participating tubular elements 12. Each connecting strip 15 consists of two tubular elements 12 which are butted together and joined non-detachable by their respective backs opposite the slitting. The bending region 5 here comprises a total of two connecting strips 15, two individual tubular elements 12 and three pairs of hinge bolts 13, so that it admits of an angled position of the sun visor 1 of virtually 90°, the bending region 5 being arcuately curved.

The lower tubular element 12 of the bending region 5 is connected rigidly to a support plate 16 which is integrated into the terminal section 6 in correspondence with its lateral extension. At the free lateral edge the support plate 16 merges into a circular yoke 17, whereby the closure edge of the sun visor 1 is blunted. The large-format lateral surfaces of the support plate 16 are coated on both sides with elastomeric plastic plates 18 which thicken the support plate 16 at its ends up to the diameter of the circular yoke 17, and their wall thickness increases slightly from the circular yoke 17 to the bending region 5. A slightly wedge-shaped configuration of the terminal section 6 results in this way. The plastic plates 18, together with the circular yoke 17, are sheathed with a plastic foil 19. The terminal section 6, as an entity, and as considered across its lateral extension, is arched slightly downwards, whereby the configuration of the contour is made to follow approximately parallel to the underside of the frame profile 7 or of the cladding 20 attached beneath the frame profile 7. This creates the possibility to fold the terminal section 6 of the sun visor 1 to close beneath the frame profile 7, or laminarly into contact with the cladding 20.

The viewing height through the windscreen 3 is only slightly impaired in the rest position of the sun visor 1. If this impairment is necessarily required not to exist, in the case of low sports cars or those with a small inclination angle of the windscreen, for example, then the sun visor 1 may additionally be mounted pivotably as an entity about a principal axis 21 which is arranged in the top edge region of the base section 4 and mounted on the vehicle body. This creates the possibility to transfer the sun visor 1 selectively into its rest position beneath the frame profile 7 or into a second rest position pivoted anti-clockwise through virtually 180° out of the first rest position, in which the terminal section 6 contacts the canopy of the roof 2 with its opposite wide side. Due to the articulation in the bending region 5, the sun visor 1, in both rest positions, can be brought with its terminal section 6 into a laminar contact position, because the bending region 5 permits a different degree of angling of the sun visor 1 into both these positions. Again in the second rest position of the sun visor 1, therefore, maximum head clearance is ensured for the front occupants of the sports car. If the sports car is a convertible, then the sun visor 1 in its second rest position with the roof 2 removed - which is a so-called hardtop in this case - additionally provides a wind deflection action. This wind deflection action can be increased as far as an extended position indicated in the drawing, in which a predominant surface fraction of the sun visor 1 projects above the roof contour. Between this extended position and the rest position at the roof, the inclination of the sun visor 1 can be varied by different degrees of bending in the bending region 5. The sun visor 1 is therefore capable of assuming the auxiliary function of a variable-inclination wind deflector.

Pivoting of the sun visor 1 past the head of the occupant sitting behind the sun visor 1 can always be effected with the sun visor 1 maximally angled, when the latter exhibits a definitely smaller effective pivoting width than in its extended position.

For aesthetic reasons particularly, the bending region 5 may be masked from the exterior by a concertina bellows 22 which adjoins the contour of the terminal section 6 and of the base section 4 somewhat flush with the exterior surface. However, other forms of masking means, such as elastomeric foam coverings or the like, for example, are also contemplated according to alternative embodiments.

The retaining forces which have to be exerted at the joints in order to immobilize the sun visor 1 in the various bending and pivoting positions, differ according to the purpose of use of the sun visor 1.

If the latter is used as a pure sun visor 1, then its immobilization may be effected by frictional engagement both in the principal axis and also in the bending axes, all of which are oriented parallel to the principal axis 21. This creates the advantage of a totally infinite angular adjustment.

On the other hand, if the sun visor 1 is required to assume conjointly the function of a wind deflector, then substantially higher retaining forces are necessary, because the sun visor 1 is placed in the flowed cross-section of the associated motor vehicle.

Figure 2:
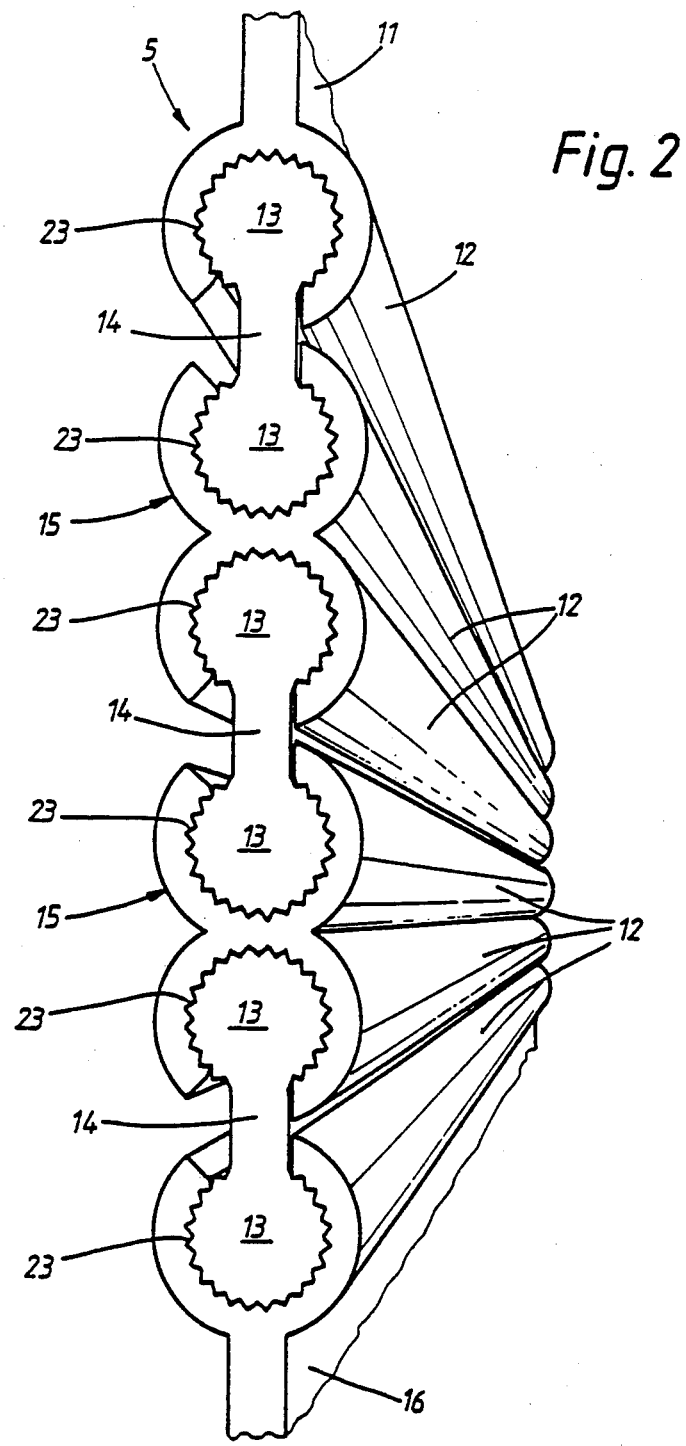
FIG. 2 is a perspective view of a bending region of the sun visor according to FIG. 1 on a larger scale.

It is clear from FIG. 2, which illustrates the bending region 5 in an extended position, than an axial tooth system 23 is provided in each case between the external circumference of the hinge bolts 13 and the internal circumference of the tubular elements 12. The axial tooth system 23 exhibits a fine tooth pitch, after the manner of a notch tooth system, for example. An extremely finely graduated catching of the tubular elements 12 with the associated hinge bolts 13 over the possible bending angle is thereby ensured. Simultaneously, an entirely stable positive engagement is created in the caught or clamped state, because a temporary cancellation of the positive engagement by rotating the tubular element 12 relative to the hinge bolt 13 is only possible by a considerable spreading of the tubular element 12. In conformity with the high pretension of the tubular element 12 which is associated with the spreading, it catches with the hinge bolt 13 automatically tooth by tooth. Furthermore, the drawing clearly shows that the extended position of the bending region 5 is also precisely defined by the fact that all the cut flanks generated by the slitting of the tubular elements 12 and located on one side of the bending region strike against the associated countersurfaces of the connecting webs 14 and thereby prevent any further bending of the joints. The principal axis 21, which is not illustrated in detail, can be locked by a similar positive connection or be "pivotally lockable" to the vehicle body in another known manner.

Figures 3, 4:
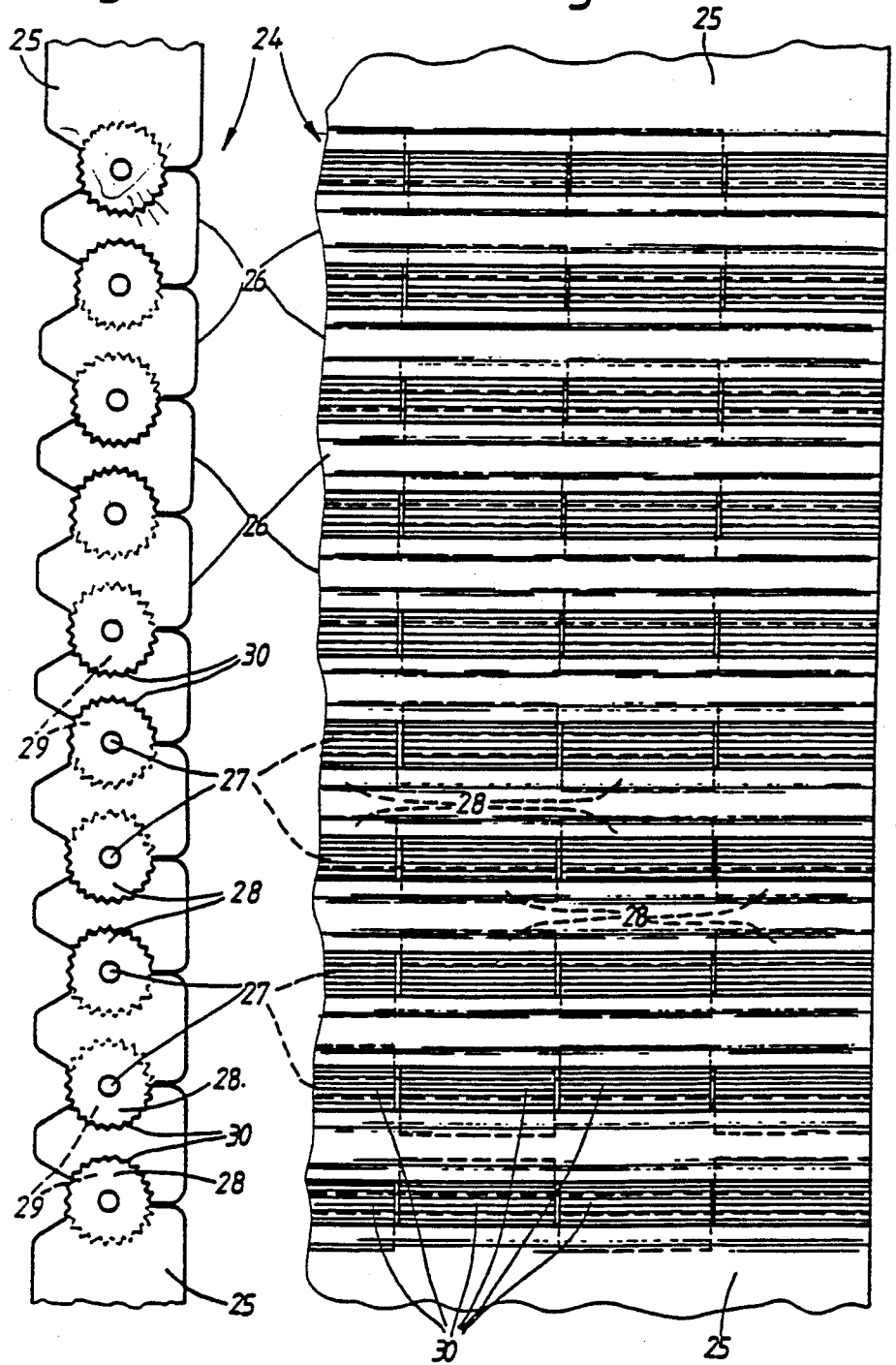
FIG. 3 shows an alternative construction of a bending region according to FIG. 2 in an extended position.
FIG. 4 shows a plan view of the bending region of the embodiment according to FIG. 3.

FIGS. 3 and 4 show a contemplated further variant for the configuration of the bending region 5 with a jointed band 24 which is attached by terminal fastening flanges 25 to the base section 4 and to the terminal section 6. The jointed band 24 itself consists of a plurality of connecting strips 26 which each exhibit a wedge-shaped basic cross-section, whilst the edges between the wedge base and the wedge surfaces are rounded and the wedge crests are flattened. The connecting strips 26 are located closely juxtaposed in the extended position illustrated, whilst the base of all the participating connecting strips 26 is located in one plane and the wedge surfaces of the respectively adjacent connecting strips 26 butt together in the proximal region of their base. All the connecting strips 26 extend along the total length of the sun visor 1 and are respectively articulated in pairs to a likewise continuous hinge bolt 27. The hinge bolts 27 are arranged precisely centrally between two adjacent wedge surfaces.

In order to articulate the connecting strips 26 to the common hinge bolts 27, each second connecting strip 26, considered across the width of the jointed band 24, is provided with bearing plates 28 projecting out from both its wedge surfaces concentrically to the adjacent hinge bolts 26, in which the hinge bolts 27 are mounted centrally for rotation. The bearing plates 28 exhibit a cross-section which is somewhat greater than a semicircle. They engage positively into counterpart hollow throats 29 of the two adjacent connecting strips 26, which in turn exhibit an inside cross-sectional surface which is somewhat smaller than a semicircle. Considered along the length of the connecting strips 26, a plurality of longitudinal sections are provided in each case, which are provided alternately with two laterally projecting bearing plates 28 and two hollow throats 29 recessed out of the connecting strips 26. These are preferably longitudinal sections of equal length, the end faces of which in the transition between hollow throats 29 and bearing plates 28 are oriented precisely mutually parallel and at right angles to the axial direction of the hinge bolts 27. This produces a stepped interlacing of the respectively juxtaposed connecting strips 26, whilst in the state of engagement they are mutually articulately connected by sliding in the hinge bolts 27. In order that a similar attachment of the jointed bands 24 to the fastening flanges 25 is possible, the fastening flanges 25 are likewise provided with a wedge surface on the jointed band side, and alternately with raised projecting bearing plates 28 and recessed hollow throats 29 in the direction of their longitudinal extension.

The mutual deflection of the connecting strips 26 is also limited, in the bent position not shown, by the mutually opposite wedge surfaces striking together.

In order to permit a locking of the connecting strips 26 in various mutual bent positions, a filigree axial tooth system 30 is provided between the circumferential surfaces of the bearing plates 28 and the corresponding hollow throats 29 in each case. The functioning principle of the sun visor 1 provided with a jointed band 24 in the bending region 5 remains unchanged and is therefore not described again. The advantage of the jointed band variant lies principally in the fact that here the connecting strips 26 may consist of resilient plastic. Consequently a reduction of manufacturing costs for the sun visor 1 is possible by the application of known injection molding methods for the production of the connecting strips 26, for example.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A panel, particularly for use with vehicles, comprising a plurality of surface sections mutually flexible at common bending areas to form a bending region, which surface sections are transferable alternately into multiple desired bending positions and are retained therein, wherein the panel is flexible only at an obtuse angle at each bending axis located between two adjacent surface sections, wherein a plurality of mutually aligned surface sections of the panel are constructed as narrow connecting strips, wherein all the surface sections of the panel are retained in the desired mutual bending positions by self-locking at the bending axes, wherein the panel forms a sun visor having a base section mounted on a vehicle body, which is connected to a terminal section by a bending region formed by the connecting strips, the sun visor being arranged behind an associated windscreen of a motor car, while the base section of the sun visor is located behind a top frame profile of a windscreen frame so that a head collision zone of the frame profile is masked by the base section, and wherein the bending region is designed so that the terminal section is foldable round the frame profile until it is located close beneath the frame profile.

2. A panel according to claim 1, wherein all the bending axes of the masking device are oriented mutually parallel.

3. A panel according to claim 1, wherein the bending axes are formed by hinge bolts.

4. A panel according to claim 3, wherein the hinge bolts are dimensioned to correspond to the length of the bending axis.

5. A panel according to claim 3, wherein two hinge bolts are mutually non-detachably connected at their long sides by means of a narrow connecting web, and wherein the thickness of the connecting web is definitely smaller than the diameter of the associated hinge bolts.

6. A panel according to claim 5, wherein each hinge bolt is positively embraced by a longitudinally slitted tubular element which is spread by resilient springing so that the slit width is greater than the thickness of the connecting web.

7. A panel according to claim 6, wherein two tubular elements are joined non-detachably to form a connecting strip, and wherein the common joint line is oriented approximately diametrically to the slitting of the two tubular elements in each case.

8. A panel according to claim 6, wherein the tubular element is clamped in various angular positions on the hinge bolt.

9. A panel according to claim 8, wherein a counterpart axial tooth system is provided between the circumference of the hinge bolt and the internal circumference of the tubular element.

10. A panel according to claim 9, wherein the pitch of the axial tooth system is chosen so that the tubular element is virtually infinitely lockable on the associated hinge bolt.

11. A panel according to claim 1, wherein two adjacent connecting strips are articulated on a common hinge bolt.

12. A panel according to claim 11, wherein the connecting strips exhibit a wedge-shaped basic cross-section and are mutually connected jointed-band fashion.

13. A panel according to claim 12, wherein the wedge surfaces of the connecting strips are provided alternately with hollow throats of somewhat circular segment-shaped inside cross-section and with raised projecting bearing plates which in turn exhibit a more than semi-circular cross-section and are mounted on the hinge bolt.

14. A panel according to claim 13, wherein the hollow throats and the corresponding bearing plates are provided with a counterpart axial tooth system.

15. A panel according to claim 1, wherein a plastically deformable impact element, which is coordinated with vertical extension of the frame profile, is integrated into the base section of the sun visor.

16. A panel according to claim 1, wherein the articulated bending region is lined with masking means.

17. A panel according to claim 16, wherein a concertina bellows or the like is provided as the masking means.

18. A panel according to claim 1, wherein the sun visor is pivotable as an entity about a principal axis provided at its longitudinal edge and spaced from the bending region.

19. A panel according to claim 1, wherein in the case of convertibles, the sun visor is pivotally out of the roof contour as a wind deflector.

20. A panel having longitudinal and transverse axes for use with vehicles, comprising:
(a) a plurality of surface sections jointed by hinge means to perform a bending region, said plurality of surface sections comprising strip members extending along the longitudinal axis of the panel and pivotally movable about the longitudinal axis and with respect to one another to form the bending region of the panel, each strip member having longitudinally slitted tubular elements forming resilient sockets at each end of a connecting strip, each longitudinally slitted tubular element being positioned at a predetermined angle to the transverse axis of the panel and wherein said hinge means comprise hinge bolts for pivotally connecting adjacent strip members, each hinge bolt having cylindrical end portions of a predetermined diameter connected by a web with a predetermined thickness, the cylindrical end portions being press fitted into and retained by the resilient sockets of adjacent strip members to form a pair of spaced pivot axis between each adjacent strip member, the diameter of the cylindrical end portion being selected to force the longitudinally slitted tubular element open to a predetermined inside spread width greater than the predetermined thickness of the web, the thickness of the web being coordinated with the spread width and the predetermined angle of the slitted tubular element with respect to the transverse axis of the panel so that the rotation of the hinge in the resilient sockets is limited to an acute angle of rotation with respect to the transverse axis of the panel due to the abutment of the web with a side of the socket;
(b) a rigid panel member connected to at least one side of the bending region;
(c) connecting means for connecting the bending region of the panel to the rigid panel member;
(d) locking means for releasably locking adjacent surface sections at a desired pivot angle, the locking means being interlocking, a tooth means forceably movable over one another to set the desired pivot angle, at least one of the tooth means being resiliently movable over the other tooth means to set the desired pivot angle, said locking means further comprising a series of ridges and grooves formed on the external surface of the cylindrical end portions of each hinge bolt and a complimentary series of ridges and grooves provided on the internal surface of the resilient sockets of each strip member which engage the series of ridges and grooves of the hinge bolts to releasably lock the hinge bolt to the strip member at the desired pivot angle;
(e) said panel forming a sun visor having a base section, mounted on a vehicle body which is connected to a terminal section by the bending region formed by the connecting strips, the sun visor being arranged behind an associated wind screen of a motor vehicle while the base section of the sun visor is located behind a top frame profile of a windscreen frame so that a head collision zone of the frame profile is masked by the base section; and
(f) the bending region being designed so that the terminal section is foldable around the frame profile until it is located beneath the frame profile.

21. A panel according to claim 20, wherein a plastically deformable impact element, which is coordinated with a vertical extension of the frame profile, is integrated into the base section of the sun visor.

22. A panel according to claim 20, wherein the bending region is lined with masking means for masking the bending region.

23. A panel according to claim 22, wherein a concertina bellows is provided as the masking means.

24. A panel according to claim 20, wherein the sun visor is pivotable as an entity about a principal axis provided at its longitudinal edge and spaced from the bending region.

25. A panel according to claim 20, wherein the vehicle is a convertible and the sun visor is pivotable out of a roof contour as a wind deflector.

26. A panel according to claim 20, wherein:
(a) said panel has longitudinal and transverse axes;
(b) said plurality of surface sections comprise strip members extending along the longitudinal axis of the panel and pivotally movable about the longitudinal axis and with respect to one another, each strip member having a substantially wedge-shaped cross-section, a first set of strip members being provided with substantially semi-circular hollow throats and a second set of strip member being provided with at least semi-circular projecting bearing plates which are complementary to and rotatably received by the hollow throats of the first set of strip member such that strip members of the first set are adjacent to strip members of the second set;
(c) said connecting means comprise a bolt for pivotally connecting strip members of the first set with strip members of the second set; and
(d) said locking means further comprises a series of ridges and grooves provided on the external surface of each projecting bearing plate and a complementary series of ridges and grooves provided on the inside of the hollow throats which engage the series of the ridges and grooves of the projecting bearing plates to releasably lock the bearing plate to the hollow throat at the desired pivot angle.

* * * * *